Patented Jan. 26, 1926.

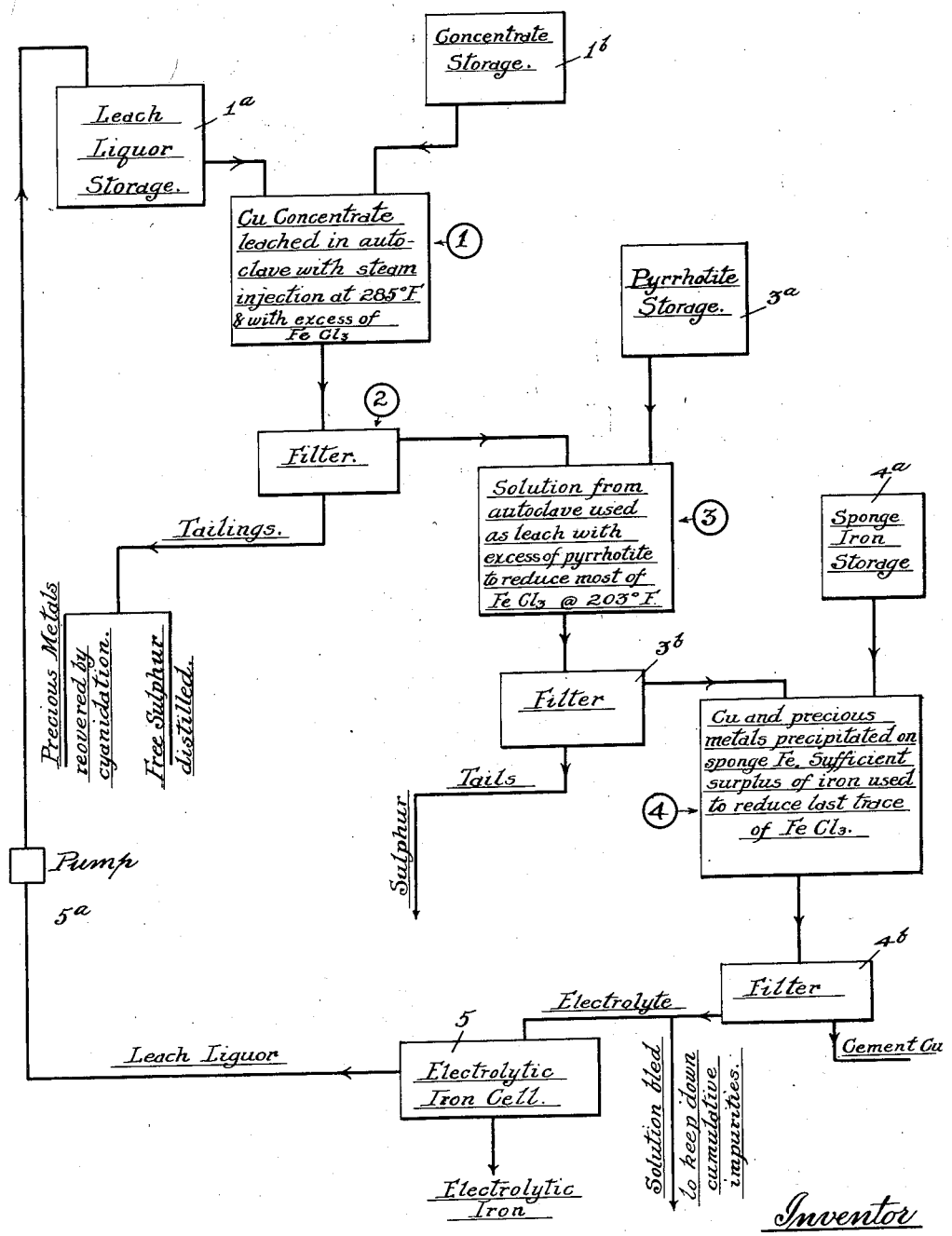

1,570,777

UNITED STATES PATENT OFFICE.

ROBERT D. PIKE, OF SAN FRANCISCO, CALIFORNIA.

PROCESS FOR TREATING SULPHIDE ORES.

Application filed June 13, 1923. Serial No. 645,167.

*To all whom it may concern:*

Be it known that I, ROBERT D. PIKE, a citizen of the United States, residing at city and county of San Francisco and State of California, have invented certain new and useful Improvements in Processes for Treating Sulphide Ores, of which the following is a specification.

The hereinafter described invention relates to a method for the treatment of sulphide ores in such a manner as to expedite the operation of treatment and to obtain a higher yield of metal in the solution than results from the use of existing methods for the treating of sulphide ores or concentrates, whereby the expense of operation is materially reduced and a material increase in value of recoveries made.

It is well known in the art of hydrometallurgy as now practiced that solutions of ferric salts, such as ferric sulphate and ferric chloride, will attack the sulphides of the metals to a greater or less extent. For example, simple sulphides of copper and zinc are readily attacked by hot solutions at a temperature between 190° and 200° F. Ferrous sulphide (pyrrhotite) is readily attacked, but some of the natural double sulphides of copper and iron, notably copper pyrites, are scarcely attacked, even when very finely ground and subjected to the treatment.

When the reaction proceeds the ferric salt is reduced to ferrous, the metal of the sulphide goes into solution as a sulphate or chloride and free sulphur is precipitated. If air is present, a considerable portion of the sulphur is oxidized to sulphur trioxide ($SO_3$) forming sulphuric acid in the solution. If the solvent in use is a chloride, which after the solution of the sulphite is treated with iron for precipitating copper and other metals and is then used as an electrolyte in a cell for the production of electrolytic iron, with a consequent, regeneration of the solvent for the solution of more sulphite, the oxidation of the sulphur to sulphuric acid is a disadvantage. In the carrying out of the present methods for the treatment of pyrrhotite, iron ores containing copper for the production of copper and electrolytic iron, the ore is leached in counter-current with a solution containing ferric chloride at a temperature varying from 185° to 203° F. Practically half the iron of the fresh solution is in the ferric state, the balance ferrous, and besides the iron the solution carries certain other materials which circulate and whose nature and concentration depend upon the impurities in the ore and the chemical processes which take place in the cycle. The solution leaves the leaching step of the process in contact with fresh ore and contains practically no ferric iron; what small content there may be is usually reduced by suitable means. The next step is to remove the copper by bringing the solution into contact with iron and suitable steps are then taken to remove impurities which are injurious to the quality of the electrolytic iron or which tend to accumulate in the cycle. The solution, still hot, next goes to the cells for producing electrolytic iron and here the electrolytic iron is plated out and about one-half of the iron in solution is oxidized to the ferric state. The solution is then returned to the leaching stage. It will be understood that the same cycle can be carried out with the use of ferrous ferric sulphate solution.

My invention resides in the discovery that if sulphide ores or concentrates with solutions containing ferric chloride or sulphate be treated in an autoclave under a steam pressure corresponding to temperatures at or above the melting point of sulphur, that both the speed of reaction and the percentage of metals taken into solution is greater than that which results by the use of the present used methods for the treatment of the sulphide ores.

In carrying out the reaction the ore or concentrates should be finely ground and the mixture of ore or concentrate with the leaching solution be strongly agitated. The reason for the greater speed and the higher yield of the metal into solution is that the molten sulphur is torn away from the particles of sulphide ore by agitation, thus giving the chloride an opportunity to continue the solvent action of the sulphide. The sulphur itself is not attacked by ferric chloride or ferric sulphate and if the sulphide particles become coated with a film of sulphur the solvent action ceases.

Any steam pressure maintained in the autoclave giving a temperature above the normal boiling point at atmospheric pressure aids the solvent action, but I have found that the best results are obtained when the temperature is above the melting point of sulphur.

A further advantage of my method invention is that because it is carried out quickly and away from contact with the oxygen of the atmosphere very little of the elemental sulphur, which is a valuable product of the reaction, is oxidized.

The following is given as an example of the application of my method invention, although not by way of a limitation thereof. In the case here given the material treated is a bornite copper concentrate assaying as follows:—

| | |
|---|---|
| Copper | 28.05% |
| Iron | 15.18 |
| Sulphur | 16.21 |
| Alumina | 7.75 |
| Magnesia | 2.06 |
| Lime | 2.78 |
| Silica | 19.65 |
| Gold | .1 oz. per ton. |
| Silver | 6.7 oz. per ton. |

After treatment of the concentrate within an autoclave with a solution containing the ferric chloride or sulphate under agitation for a period of approximately one-half hour and at a temperature of 285° F. the following percentages of metals went into solution:

| | Per cent. |
|---|---|
| Copper | 98.84 |
| Iron | 57.80 |
| Gold | 34.00 |
| Silver | 96.90 |

Sulphur recovered as elemental sulphur—75%.

The same concentrate agitated with the same solution for one-half hour at 203° F. showed the following recoveries:—

| | Per cent. |
|---|---|
| Copper | 83.08 |
| Iron | 48.03 |
| Gold | 20.0 |
| Silver | 92.1 |

Sulphur recovered as elemental sulphur—41.7%.

The tailings from the solvent process can, after filtration, washing, and drying, be heated for distillation of the free sulphur and then treated by cyanidation or otherwise for recovery of the gold which is not entirely dissolved in the autoclave.

The high yields attained by working under my method invention makes possible the treatment of high value concentrates, but in treating such a material there must remain in the autoclave at the end of the solvent step a considerable excess of ferric chloride to insure that the maximum amount of the metals shall be dissolved and in order to properly carry out the subsequent steps of the cyclic process this excess of ferric chloride must be reduced as a step subsequent to my solution process.

For a comprehension of my invention reference should be had to the accompanying sheet of drawings wherein is illustrated diagrammatically a flow sheet for the treatment of the above copper concentrates, although it will be understood that a great variety of steps other than those set forth on the flow sheet may be resorted to subsequent to the solution step, dependent upon the ore or concentrate being treated and the materials which it is desired to produce.

Referring to the flow sheet it will be understood that the leaching liquor is conveyed from the leach or storage tank 1$^a$ into the autoclave 1 for intermixture therein with the concentrates delivered into the said autoclave from the concentrate storage vessel 1$^b$, the leach solution delivered into the autoclave 1 carrying an excess of ferric chloride and in the said autoclave the ore concentrate with the leaching solution is agitated or maintained under agitation in the presence of steam at a pressure corresponding to 285° F. and the agitation of the concentrates and the leach solution is maintained for approximately one hour more or less. This agitation of the leach solution and the ore concentrates under the pressure set forth, results in a portion of the ferric chloride being reduced to ferrous chloride and the soluble portion of the metal contents going into solution and an equivalent portion of elemental sulphur being precipitated. The contents of the autoclave is then discharged and flows into the filter 2 where the tailings are separated from the pregnant liquor by filtration, and pass from the filter through the tailing discharge and from said tailings the sulphur may be recovered by distillation and the residue treated for recovery of gold therefrom. The pregnant solution passes from the filter 2 through suitable connections into the vessel or treating tank 3 and in said vessel or tank is brought into contact with pyrrhotite or other suitable sulphide iron ore and treated therein at any suitable temperature, for instance 203° F. The ore supplied to the vessel or treating tank 3 from the storage vessel 3$^a$ is in sufficient quantity so that most of the remaining FeCl$_3$ is reduced. As all of this ore may not be recovered in this step of the method treatment, a relatively cheap material should be used. The contents of the treating tank 3 is then discharged into the filter 3$^b$ and the tailings filtered from the pregnant solution pass from the filter through suitable outlet provided therefor, the pregnant liquor being delivered from the filter 3$^b$ into the vessel 4, it being understood that the tailings passing from the filter 3$^b$ may at any later period be treated for the recovery of the free sulphur contents thereof. The solution flowing from the filter 3$^b$ into the vessel 4 is treated therein with iron, preferably sponge iron delivered into the said vessel 4 from the storage bin 4$^a$, for the precipitation of the copper, silver and gold contents thereof. A sufficient quantity of iron is used or delivered into the vessel or tank 4 so that all remaining trace of ferric chloride is reduced to ferrous chloride, the contents of the tank or vessel 4 being preferably maintained under agitation for a predetermined period, after which the contents of the said vessel 4 is delivered into the filter 4$^b$ as the contents of the tank or vessel 4 flows through the filter 4$^b$ the cement copper is recovered therefrom and refined and the solution flowing from the filter is subject to such purification as may be needed or required. In this case, the principal purification step will be to remove from the solution a sufficient portion of the accumulated lime, magnesia and alumina in the cycle down to the allowable limits for good working of the electrolytic cell 5 or the quick solution of the metals in the autoclave 1. The discarded portion of the electrolyte can be treated for the recovery of the hydrochloric acid by first precipitating by milk of lime under oxidizing conditions and then precipitating lime with sulphuric acid, thus regenerating hydrochloric acid which can be used for making more ferrous chloride. By this means, the chlorine losses are kept down to a very small amount. However, if zinc or other metals which plate out with iron be present they should be removed from the main circulating solution at this stage by any suitable means.

The purified electrolyte then passes to the cell 5 which may be of any suitable design for the production of electrolytic iron. The cell liquor which contains about half of its iron in the ferric state is returned to the leach storage vessel 1$^a$ through the line connection 5$^a$ by means of a pump introduced within the line system for such purpose.

A variation of the treatment outlined by the flow sheet as presented is an obvious one, the same residing in introducing the Cu concentrates initially into the vessel 3, eliminating the feed of the pyrrhotite from the tank or vessel 3$^a$ and treating the copper concentrates in the treating tank 3 with a pregnant solution containing ferric chloride or ferric sulphate from the filter 2 for the partial solution of the soluble metal content of the concentrates and the reduction of the ferric iron contents of the solution to ferrous, then separating out the tailings from the contents of the treating tank 3 by the filter press 3$^b$ and returning the tailings from this filter by any suitable means to the autoclave 1. Before returning to the autoclave 1 the sulphur may be removed from these tailings and the tailings with or without the sulphur removed are treated in the autoclave 1 with liquor from the leach liquor storage at a temperature of 285° F. for the removal of all of the soluble metal content and the partial reduction of the ferric chloride and the ferrous chloride.

While I have described the various steps incident or associated with the carrying out of the method invention, it will be understood that the essential step in the method for the treating of the sulphide ores for the purposes set forth resides in the primary step treatment of the ores or concentrates with a leaching liquor in an autoclave and preferably maintaining the contents thereof under agitation for a given period of time while subjected either to a steam pressure greater than atmospheric or to a temperature above the melting point of sulphur, and with air excluded, and I wish to be understood as claiming this feature or step of the method invention as broadly as the state of the art will warrant.

Having thus described my invention, what I claim as new and desire to secure by Letters Patent, is:

1. The method of treating ores containing sulphides of metals for decomposition of the contained sulphides which resides in subjecting the ores or concentrates to the action of a solution containing ferric chloride or ferric sulphate at a temperature equal to or above the melting point of sulphur.

2. The method of treating ores containing sulphides of metals for decomposition of the contained sulphides which resides in subjecting the ores or concentrates to a solution containing ferric chloride or ferric sulphate at a temperature equal to or above the melting point of sulphur and maintaining the ores or concentrates and the solution under agitation during the period of treatment.

3. The method of treating ores containing sulphides of metals for decomposition of the contained sulphides which consists in subjecting the ores or concentrates to a solution containing ferric chloride or ferric sulphate at a temperature above the normal boiling at atmospheric pressure.

4. The method of treating ores containing sulphides of metals for decomposition of the contained sulphides which resides in subjecting the ores or concentrates to a solution containing ferric chloride or ferric sulphate at a temperature above the normal boiling at atmospheric pressure and maintaining the ores or concentrates and the solution under agitation during the period of treatment.

5. The method of treating ores containing sulphides of metals for decomposition of the contained sulphides which resides in subjecting the ores or concentrates to a solution containing ferric chloride or ferric sulphate under a temperature greater than the normal boiling at atmospheric pressure and while maintained out of contact with the outside atmosphere.

6. The method of treating ores containing sulphides of metals for decomposition of the contained sulphides which resides in subjecting the ores or concentrates to a solution containing ferric chloride or ferric sulphate under a temperature greater than the normal boiling at atmospheric pressure, maintaining the ores or concentrates in solution under agitation and maintaining the agitated body free from contact with the outside atmosphere during the treating period.

7. The method of treating ores containing sulphides of metals for decomposition of the contained sulphides which resides in delivering ores or concentrates to an autoclave, subjecting the ores or concentrates while confined within the autoclave to a solution containing ferric chloride or ferric sulphate and at a temperature above the normal boiling at atmospheric pressure, separating the solid contents from the solution, then treating the remaining solution with an additional amount of fresh sulphide ore at a temperature at or less than the boiling point, at atmospheric pressure, to reduce the ferric iron in solution to ferrous.

8. The method of treating ores, containing sulphides of metals for decomposition of the contained sulphides which resides in subjecting an ore or concentrate to a solution containing ferric chloride or ferric sulphate at a temperature approximately that of the boiling point, at atmospheric pressure, to reduce the ferric iron in the solution to ferrous, then separating out the solid residue and treating the same in an autoclave at a steam pressure higher than atmospheric and in the presence of a solution containing ferric chloride or ferric sulphate for dissolving the balance of the soluble metal contents thereof.

9. The continuous method of treating ores or concentrates containing sulphides of metals for a decomposition of the contained sulphides which resides in subjecting the ore to be treated to the action of a solution containing ferric chloride or ferric sulphate at a temperature above the normal boiling at atmospheric pressure, separating the added metallic contents from the resulting solution, treating the said solution for the regeneration thereof to convert a portion of the ferrous iron into ferric iron, and utilizing the regenerated solution for the treatment of an additional quantity of sulphide ore or concentrates.

10. The method of treating ores or concentrates containing sulphides of metals for a decomposition of the contained sulphides which resides in subjecting the ore to be treated to the action of a solution containing ferric chloride or ferric sulphate at a temperature above the normal boiling at atmospheric pressure, separating the added metallic contents from the resulting solution, and finally treating the said solution for the regeneration thereof to convert a portion of the ferrous iron into ferric iron.

11. The method of treating ores or concentrates containing sulphides of metal for a decomposition of the contained sulphides which resides in subjecting the ore to be treated to the action of a solution containing ferric chloride or ferric sulphate at a temperature equal to or above the melting point of sulphur, separating the added metallic contents from the resulting solution, treating the said solution for the regeneration thereof to convert a portion of the ferrous iron contents into ferric iron.

12. The continuous method of treating ores or concentrates containing sulphides of metals for a decomposition of the contained sulphides which resides in subjecting the ore to be treated to the action of a solution containing ferric chloride or ferric sulphide at a temperature equal to or above the melting point of sulphur, separating the added metallic contents from the resultant solution, treating the said solution for the regeneration thereof to convert a portion of its ferrous iron contents into ferric iron and utilizing the regenerated solution for the treatment of an additional quantity of sulphide ore or concentrates.

13. In the method of treating ores containing sulphides of metals with a solution containing ferric iron, the step of which resides in causing a decomposition of the contained sulphides while the solution is at a temperature above the normal boiling at atmospheric pressure.

14. The method of treating ores containing sulphides of metals for a decomposition of the contained sulphides which resides in delivering the said ore to an autoclave and subjecting the ore while confined therein for a treating period to the action of a solution containing ferric iron at a temperature above the normal boiling at atmospheric pressure.

In testimony whereof I have signed my name to this specification.

ROBERT D. PIKE.